Patent 3,002,934 — Extended-Life Fluorination Catalyst

3,002,934
EXTENDED-LIFE FLUORINATION CATALYST
Ralph A. Davis, Midland, and Max R. Broadworth, Bay City, Mich., assignors to The Dow Chemical Company, Midland, Mich., a corporation of Delaware
No Drawing. Filed Feb. 6, 1957, Ser. No. 638,462
1 Claim. (Cl. 252—442)

This invention relates to an extended-life fluorination catalyst and is more particularly concerned with a chromium oxyfluoride fluorination catalyst in intimate mixture with aluminum fluoride.

In U.S. Patent 2,745,886 there is described a fluorination catalyst which has been defined as chromium oxyfluoride. This catalyst has shown outstanding utility for certain fluorination applications where HF is used as a fluorinating agent. However, certain halogenated organic starting materials used in a fluorination procedure have been found to poison the catalyst in a relatively short time. Even though the catalyst gives outstanding results, this short duration of activity was sufficient to cause operating difficulties in its commercial use. Particularly, methylene chloride and 1,1,1-trichloroethane caused rapid poisoning.

It is, therefore, a principal object of the present invention to provide a modified chromium oxyfluoride catalyst having a relatively extended life. Another object of the present invention is to provide a chromium oxyfluoride catalyst in intimate mixture with aluminum fluoride. Still another object of the present invention is to provide a fluorination procedure wherein the catalyst has an extended life. Still a further object was to prepare a less friable chromium oxyfluoride catalyst pellet. Other objects will become apparent hereinafter.

The foregoing and additional objects have been accomplished by intimately mixing chromium oxyfluoride and aluminum fluoride and using the resulting catalyst in a hydrogen fluoride fluorination. While both chromium oxyfluoride and specific forms of aluminum fluoride are known as fluorination catalysts, it was unexpected that a synergistic extension of the life of the mixed catalyst would be obtained. Thus, in the fluorination of a halohydropropane, a given volume of chromium oxyfluoride catalyst would be expected to have a life of less than 10 hours, and the same volume of aluminum fluoride catalyst would be expected to have a life of less than 4 hours, the same volume of a mixture of chromium oxyfluoride and aluminum fluoride gave a catalyst life substantially in excess of 20 hours.

The poisoning of the catalyst, resulting in decreased catalyst life, usually results from a type of carbonization of the catalyst whereby activity is substantially reduced. Once a catalyst has been poisoned, it is possible to reactivate this catalyst by contacting it with oxygen at temperatures in the neighborhood of 500 degrees centigrade, but, this requires an interruption of the fluorination process and generally requires up to 2 hours to accomplish satisfactory reactivation.

The intimately mixed catalyst of the present invention is readily prepared by mixing chromium oxyfluoride with aluminum fluoride either by mixing the dry powder, by dissolving in a suitable solvent or slurrying material and removing the solvent of the slurrying material therefrom. Other conventional methods whereby an intimate mixture of the chromium oxyfluoride and aluminum fluoride is obtained may also be used. The relative amounts of a basic chromium fluoride and aluminum fluoride to be employed in the extended-life catalyst of the present invention is preferably about 80 percent chromium fluoride and 20 percent aluminum fluoride. However, from 20 to 80 percent aluminum fluoride and 80 to 20 percent basic chromium fluoride may be employed for certain reactions, and 1 to 95 percent basic aluminum fluoride and 99 to 5 percent basic chromium fluoride will have applications in certain specific reactions. The chromium fluoride used for the catalyst of the present invention may be activated before or after pelleting. Thus, basic chromium fluoride may be pelleted with the aluminum fluoride and thereafter activated by heating with oxygen, or the previously oxygenated chromium fluoride may be pelleted with the aluminum fluoride and the catalyst used without the pre-treatment. Because the material is heated to about 500 degrees centigrade in order to accomplish activation of the chromium fluoride and the fluorination reaction is conducted at temperatures above 100 degrees centigrade, a dehydrated or hydrated form of the metallic fluoride may be employed for mixing. While specific forms of aluminum fluoride are required to catalyze fluorination reactions, the aluminum fluoride of the present invention may be any technical grades of aluminum fluoride as are commonly available.

The extended-life catalyst of the present invention is used in hydrogen fluoride fluorinations in a manner which has been described in some literature references and in a co-pending application filed even date herewith. Reaction temperatures from 100 to 500 degrees centigrade will be employed, and usually an excess of hydrogen fluoride is used and the contact time will vary from 1 to 20 seconds depending upon the particular fluorination involved. Even though the catalyst of the present invention gives an extended-life, it will be necessary after a certain amount of fluorination that the catalyst be reactivated. This is readily accomplished by contacting the catalyst with oxygen at about 500 degrees centigrade for at least an hour thereby to reactivate the catalyst.

If desired, the mixture of the present invention may be pelleted with sugar, graphite, etc. in a conventional catalyst pelleting technique.

The following examples are given to illustrate the catalyst of the present invention but are not to be construed as limiting the invention thereto.

*Example I*

A. A ¾" x 30" nickel tube was packed with 174 cubic centimeters of a basic chromium fluoride catalyst. The catalyst bed was heated to 240 degrees centigrade and a mixture of 65 grams (0.76 moles) of methylene chloride and 3.46 moles of hydrogen fluoride passed over the catalyst during a 2 hour period. Thus, there was a 4.5 mole ratio of organic to HF at a 5.4 seconds contact time. Distillation of the organic products yielded 49 percent of the theoretical yield (0.373 moles) of methylene fluoride, 17.4 percent of the theoretical yield (0.132 mole) of chlorofluoromethylene and 26.5 percent of the organic material was recovered unchanged. The total organic recovery was 93 percent of the theoretical.

The reaction temperature was raised to 500 degrees centigrade and the run continued for another 2 hours. During this time, 1.13 moles of methylene chloride and 3.58 moles of hydrogen fluoride were passed over the catalyst, giving a mole ratio of 3.15 and a contact time of 4.7 seconds. Upon distillation, 0.325 moles, 28.8 percent of the theoretical yield of methylene fluoride, 0.158 moles, 14.0 percent of the theoretical yield of chlorofluoromethane and 0.293 moles of unchanged organic was recovered. The total organic recovery was 68.7 percent. At the end of this time the catalyst was badly carboned and had to be burned off.

B. A 2" x 30" nickel reactor was packed with a basic chromium fluoride catalyst to an approximate bed depth of 20". After activation with oxygen, the following series of runs was made.

| Run # | Length of Run | | Accumulated Time | | Grams $CH_2Cl_2$ | Moles $CH_2Cl_2$ | Moles HF | Mole Ratio, HF/Organic | Furnace Temp. | Contact Time | Titrated Conversion, Mole Percent |
|---|---|---|---|---|---|---|---|---|---|---|---|
| | Hrs. | Min. | Hrs. | Min. | | | | | | | |
| 1 | 1 | 14 | 1 | 14 | 341 | 4.02 | 14.17 | 3.53 | 450 | 5.5 | 63.4 |
| 2 | 1 | 15 | 2 | 29 | 364 | 4.29 | 14.56 | 3.43 | 400 | 5.9 | 59.2 |
| 3 | 1 | 14 | 3 | 43 | 372 | 4.38 | 14.07 | 2.90 | 350 | 7.2 | 55.2 |
| 4 | 1 | 00 | 4 | 40 | 233 | 2.75 | 9.92 | 3.61 | 300 | ? | 37.1 |

It was necessary to stop the run between the 4th and 5th hour as the bed had become so badly choked with carbon that the back pressure stopped the flow of $CH_2Cl_2$ and slowed the HF flow.

Run No. 3 was distilled giving the following results:

| Material | Grams | Moles | Moles |
|---|---|---|---|
| $CH_2F_2$ | 110.8 | 2.13 | 50.3 |
| $CH_2ClF$ | 33.9 | 0.50 | 25.4 |
| $CH_2Cl_2$ | 91.3 | 1.08 | 11.7 |
| Recovery, percent | | | 87.4 |

C. The reactor of Example I–B was charged with 1320 cubic centimeters of a mixture of 80 percent chromium oxyfluoride and 20 percent aluminum fluoride which had been slurried with an 18 percent aqueous solution of hydrogen fluoride, the slurry dried, and pelleted with 2 percent sugar and 2 percent graphite. The reactor was heated to 350 degrees centigrade, and a mixture of 88 gram moles of hydrogen fluoride and 28.6 gram moles (2430 grams) of methylene chloride passed therethrough. The HF/methylene chloride mole ratio was 3.075, the length of the run was 6 hours, and the contact time was 4.78 seconds.

Hourly crude conversion data:

| Time | $CH_2Cl_2$ Charged, gm. moles | Material in Dry Ice Trap Weighed as $CH_2F_2$, gm. moles | Conversions to $CH_2F_2$ Based on Weight of Crude Material, percent |
|---|---|---|---|
| 1st hr | 5.6 | 1.59 | 30.2 |
| 2d hr | 5.53 | 3.08 | 55.7 |
| 3d hr | 5.52 | 2.9 | 52.6 |
| 4th hr | 5.51 | 3.19 | 57.9 |
| 5th hr | 3.43 | 2.23 | 64.9 |
| 6th hr | 3.0 | 1.75 | 58.4 |

Analysis of total recovered product (Mass spec.):

| Material | Wt./Gm. | Mole | Mole |
|---|---|---|---|
| $CH_2F_2$ | 442 | 8.5 | 29.7 |
| $CH_2ClF$ | 621 | 9.07 | 31.7 |
| $CH_2Cl_2$ | 685 | 8.06 | 28.2 |

Recovery _____ 89.6 percent
Yield of $CH_2F_2$ _____ 74 percent

No definite indication of catalyst failure was noted at the end of the 6th hour.

*Example II*

A. A 2" x 36" nickel reactor was charged with 872 cubic centimeters of chromium oxyfluoride catalyst which was activated with oxygen at 500 degrees centigrade for 2 hours. The reactor was cooled to 400 degrees centigrade, and 11.37 gram moles (1518 grams) of 1,1,1-trichloroethane and 50.46 gram moles of hydrogen fluoride passed through the reactor over a period of 2 hours and 30 minutes. The mole ratio of HF/organic was 4.44 and the contact time was 2.3 seconds.

The conversion to $CH_3$—$CF_3$, based on distilled product, was 31.7 percent.

30.6 moles of $CH_3$—$CCl_3$ were fluorinated in a series of 5 runs at 250 to 400 degrees centigrade. The longest time of operation without regeneration was 2½ hours at 400 degrees centigrade. The titrated conversion during the first 1 hour and 30 minutes of this run was 91 percent, but during the next hour was only 67 percent.

B. A mixture of 80 percent chromium oxyfluoride and 20 percent aluminum fluoride was used to replace the chromium oxyfluoride of Example II–A. The following chart sets up the results:

| Catalyst | 80 percent $Cr(OF)_3$ | 20 percent $AlF_3$ |
|---|---|---|
| Run # | B-III-101 | B-III-104 |
| Furnace Temp., °C | 400 | 350 |
| HF Charged, Gm. M | 122.3 | 91 |
| $CH_3CCl_3$ Charged, Gm. M | 23.8 | 10.9 |
| $HF/CH_3CCl_3$ Mole Ratio | 5.14 | 8.32 |
| Contact Time, sec | 2.4 | 4.2 |

Hourly conversion to $CH_3CF_3$ from wt. of material in Dry Ice trap:

| | Mole percent | |
|---|---|---|
| 1st hr | 54 | 53.7 |
| 2nd hr | 57.7 | 71.7 |
| 3rd hr | 49.3 | 62 |
| 4th hr | 37.1 | 51.2 |
| 5th hr | | 44.5 |

Analysis of total product:

| | Mole percent | |
|---|---|---|
| $CH_3CF_3$ | 26.1 | 32.6 |
| $CH_3CClF_2$ | 7.1 | 3.5 |
| $CH_2=CClF$ | | 1.8 |
| $CH_2=CCl_2$ | 62.6 | 53.7 |
| Recovery | 95.8 | 91.6 |
| Yield, percent | 86.1 | 79.6 |

Even though the catalyst had been reacted for 5 hours, there was no obvious carbonization of the catalyst, as occurred in a comparable 2½ hour period with chromium oxyfluoride unmixed with aluminum fluoride.

*Example III*

A. A 2" x 30" nickel reactor was filled with 1320 cubic centimeters of chromium oxyfluoride catalyst, the reactor heated to 350 degrees centigrade and a mixture of 9.35 gram moles (1700 grams) of 1,1,1,3-tetrachloropropane and 113.3 gram moles of hydrogen fluoride charged to the reactor over a period of 4.5 hours. The HF/organic mole ratio was 12.1 and the contact time was 3.4 seconds. Titration of the HCl showed 86.4 percent conversion to 3,3,3-trifluoropropene. During the final 1½ hours of the 4½ hour run, the weighed conversion was 58.4 percent.

B. The procedure of Example III-A was repeated with a catalyst comprising 80 percent chromium oxyfluoride and 20 percent aluminum fluoride. 22.3 gram moles (8054 grams) and 371.6 gram moles of hydrogen fluoride were passed into the reactor over 21 hours, giving a mole ratio of HF/organic of 16.7 and a contact time of 4.9 seconds. Titration of the HCl showed 99.8 percent conversion to 3,3,3-trifluoropropene. During the 20th hour, the conversion was 86 percent and during the 21st hour, the conversion was 82.4 percent.

In a manner similar to that of the foregoing examples, other halohydrocarbons may be used in the extended catalyst life fluorination. Representative halohydrocarbons which may be used as starting materials in the fluorination process include, for example, fluoro-, chloro-, and bromo-methanes, ethanes, propanes, butanes, hexanes, propylenes, butylenes, pentylenes, methylacetylenes, ethylacetylenes, pentadienes, etc.

Various modifications may be made in the catalyst of the present invention without departing from the spirit or scope thereof and is to be understood that we limit ourselves only as defined in the appended claim.

We claim:

An extended-life fluorination catalyst consisting of 80 percent chromium oxyfluoride and 20 percent aluminum fluoride in intimate mixture.

References Cited in the file of this patent

UNITED STATES PATENTS

| | | |
|---|---|---|
| 1,625,924 | Woodruff et al. | Apr. 26, 1927 |
| 2,364,114 | Veltman | Dec. 5, 1944 |
| 2,481,273 | Young | Sept. 6, 1949 |
| 2,501,197 | Veltman et al. | Mar. 21, 1950 |
| 2,676,996 | Miller et al. | Apr. 27, 1954 |
| 2,744,148 | Ruh et al. | May 1, 1956 |
| 2,745,886 | Ruh et al. | May 15, 1956 |